United States Patent

[11] 3,581,572

| [72] | Inventor | Roger L. Frick |
| | | Minneapolis, Minn. |
| [21] | Appl. No. | 831,103 |
| [22] | Filed | June 6, 1969 |
| [45] | Patented | June 1, 1971 |
| [73] | Assignee | Rosemount Engineering Company |
| | | Minneapolis, Minn. |

[54] EXTRUDER PRESSURE SENSOR
11 Claims, 2 Drawing Figs.

[52] U.S. Cl. .................................................. 73/406,
   73/395
[51] Int. Cl. ................................................... G01l 7/08
[50] Field of Search ......................................... 73/395,
   408, 406

[56] References Cited
UNITED STATES PATENTS
2,864,393  12/1958  Drake .......................... 73/407(PR)
2,883,995  4/1959  Bidlous et al. ................. 73/395X
2,902,861  8/1959  Frost et al. .................... 73/408
3,393,612  7/1968  Gorgen et al. ................. 73/406X
3,482,449  12/1969  Werner .......................... 73/406

*Primary Examiner*—Louis R. Prince
*Assistant Examiner*—Daniel M. Yasich
*Attorney*—Dugger, Peterson, Johnson & Westman

ABSTRACT: A pressure sensor for use with high-pressure extruders utilizing a mechanical force-rebalance system wherein a pressure sensed at a first diaphragm causes a flow of fluid from a source of fluid under pressure to enter a chamber. The fluid pressure acts on a second diaphragm or piston member to balance the force on the first diaphragm through a mechanical system. The amount of fluid pressure at the second diaphragm necessary to rebalance the first diaphragm is indicative of the pressure sensed by the first diaphragm.

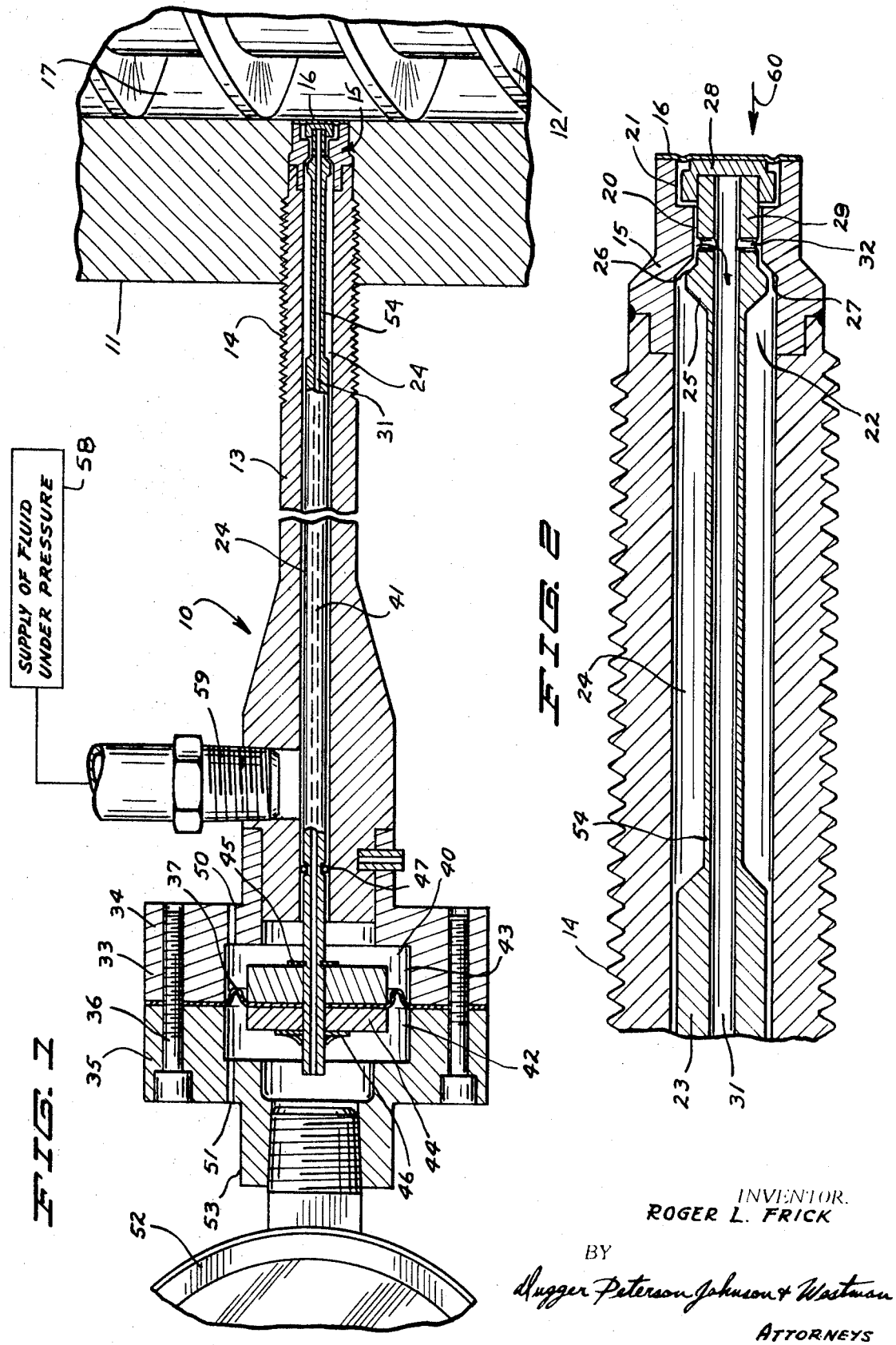

EXTRUDER PRESSURE SENSOR

BACKGROUND OF THE INVENTION

1. Field of the Invention

The present invention relates to sensors for use with extruders for sensing the extruder pressures.

2. Prior Art

In force-rebalancing diaphragm-pressure sensors, simplicity of operation in manufacture has long been sought. In addition, in relatively low pressure ranges the problem of force-rebalance mechanism sticking or hanging up is always prevalent where mechanical components are required to transmit force and motion signals.

Fluid-actuated extruder-pressure-sensors as described in U.S. Pat. No. 3,482,449 have worked over wide pressure ranges. However, under certain conditions of operation, particularly for measurement of relatively low pressures, performance improvement is sought.

Another commonly present problem is repair and maintenance of fluid-controlled rebalance-pressure sensors. The sensor valves typically wear or become dirty after extended use and it is highly desirable to provide a sensor construction which can be readily dismantled and reconditioned without drastically affecting the calibration of the instrument.

SUMMARY OF THE INVENTION

The present invention relates to a fluid-actuated force-rebalance-pressure-sensing device for use with extruder pressures which will work across a wide range of pressures and minimizes problems caused from sticking or hanging up of the force-rebalance system used. Further, the construction is such that the unit can be easily made without critical tolerances or a large number of parts and can be repaired if it becomes damaged.

A regulating valve for regulating the flow of fluid to the force-rebalancing diaphragm is mounted onto a mechanical force-rebalance rod and is designed so that it can flex slightly to give positive and accurate regulation with respect to the valve seat.

BRIEF DESCRIPTION OF THE DRAWINGS

FIG. 1 is a sectional view of an extruder-pressure sensor made according to the present invention with portions of the device broken away; and FIG. 2 is a fragmentary enlarged sectional view of the lower end portion of the device of FIG. 1.

DESCRIPTION OF THE PREFERRED EMBODIMENT

An extruder-pressure sensor shown generally at 10 is shown installed in the barrel 11 of an extruder. As shown, a screw 12 is used for the extruder, and the barrel is relatively heavy to withstand the high pressures inside the extruder. The sensor could be mounted in the end adapter section of the extruder where the sensing end would not be directly subjected to the action of the flights or lands of the helical screw. The sensor comprises a housing including an elongated circular cross section stem 13 which has a threaded portion 14 that as shown screws into a provided opening in the barrel 11 of the extruder. The end portions 15 of the stem extends into the high-pressure area and has a first sensing diaphragm 16 of relatively small diameter which fits substantially flush with the interior surface 17 of the extruder barrel. The portion 15 comprises a valve (diaphragm) assembly. The interior of the valve assembly has a central chamber 20, an end chamber 21, and a valve chamber 22. The valve chamber 22 opens to and forms a continuation of an interior chamber 24 in the stem 13. An elongated force-balance valve assembly 23 is mounted inside the interior passageway or chamber 24. The valve assembly 23 includes a force-rebalance-rod portion 41 and a valve head 25. The valve head has an end shank 29 which slidably fits within the chamber or passageway 20 of the valve and is spaced from the wall defining this passageway 20. The valve head 25 is of larger size than the chamber or passageway 20 and has a conical valving surface 26 that mates within a conical valve seat surface 27 defined in the valve assembly. The valve seat surface 27 joins the surfaces defining the valve chamber 22 and the central chamber 20. The end shank 29 of the valve assembly fits within a provided receptacle in an overpressure stop-actuator member 28 positioned in chamber 21 and the stop member 28 rests against the diaphragm 16.

The force-rebalance-rod portion 41 of valve assembly is tubular as shown, and has a center passageway or opening 31 extending from the valve head to the remote end of the unit. A plurality of radial holes or openings 32 are provided through the wall of the valve assembly and lead from the center passageway 31 to the outside of the valve member 23 in the region of the central chamber 20. The openings 32 are on the opposite side of the valve seat 27 and the valve surface 26 from the remote end of the valve member.

The stem 13 is mounted into a housing 33 at a remote end of the pressure sensor. The housing 33 comprises a base or mounting member 34 and a cover member 35 which are held together with suitable screws 36 and clamp a second movable diaphragm 37 therebetween. The base 34 is held on stem 13 with a suitable lock pin. The housing member forms an interior compartment 40. The diaphragm 27 is used as a force-rebalancing diaphragm, and is attached to the force-rebalance-rod portion 41 of valve assembly 23. The diaphragm 37 extend across the compartment 40 to divide the compartment into two separated chambers. A first chamber 42 is on the opposite side of the diaphragm 37 from the valve head 25, and a second chamber 43 is on the same side of the diaphragm as the valve head 25. The diaphragm 37 is attached to the rod 41 through the use of a pair of clamped blocks 44. A first one of the blocks is positioned up against a split-ring fastener 45 which is positioned in a groove in the outer surface of the rod member 41. The diaphragm is then slid over the rod 41 against the first block and a second block is placed on the rod 41 against the diaphragm and a push-on type gripping fastener 46 is slid over the rod 41 and used to clamp the two blocks together with the diaphragm between them. As can be seen, the blocks fit snugly around the force-rebalance rod and the diaphragm 37 has an opening which snugly fits around the force-rebalance rod as well. The diaphragm 37 is extremely flexible but substantially nonstretchable and is made of a fabric and rubber material. The diaphragm 37 actually moves much like a piston inside the chamber 40 in response to pressures in the chamber and movement of the diaphragm results in movement of the rod member. An O-ring-type seal 47 is utilized to seal the outer surface of the rod 41 against the inner surface of the passageway or chamber 24 in the stem 13. The chamber 43 is vented to the atmosphere with a vent 50 and the chamber 42 is vented to the atmosphere through an orifice 51 which meters the amount of fluid or air that can flow out of the chamber 42. A pressure gauge 52 of any desired type which can read fluid pressures is mounted into a neck 53 of the member 35 and is open to the first chamber 42 to sense pressures in this first chamber. The interior passageway 31 in the force-rebalance-rod portion 41 opens into the chamber 42 on the opposite side of the diaphragm 37 from the valve member.

The end portion of the rod member 41, as shown in FIG. 2, is machined down so that is has a very thin walled section 54 which joins the valve head 25. This permits the valve head to flex slightly so that the the valve head will not bind against the inner surfaces of the stem if there is any misalignment. Yet, the main portion of the rod is heavy enough to carry the loads exerted without excessive bending.

A source of fluid under pressure 58 is open through a fitting 59 to the interior chamber 24 of the stem 13.

In operation, this fluid under pressure is supplied to the chamber 24, and because of the O-ring 47, the fluid under pressure cannot escape up into the compartment 40. Then, when there is pressure on the small diaphragm 16 the diaphragm will flex in direction as indicated by arrow 60 moving the surface 26 on the valve member away from the valve seat surface 27 permitting the fluid under pressure to pass between these surfaces, through the openings 32 and into the passageway 31 in the force-balance-rod valve assembly. This fluid under pressure then passes through the passageway 31 and up into the first chamber 42 formed by the large diaphragm member 37. This fluid under pressure can pass through the orifice 51, but the supply of fluid is sufficient so that the pressure builds up in chamber 42 and acts against the diaphragm to tend to move the valve surface 26 back toward valve seat 27 thereby throttling or metering the flow of fluid under pressure. The force-rebalance rod and valve assembly acts through member 28 to balance the force on first diaphragm 16. When the valve assembly reaches a balance, there will be fluid flow through he the valve seat 27 and surface 26 into chamber 42 and out orifice 51. The pressure in the chamber 42 at the valve equilibrium point is recorded on the pressure gauge 51 (or with suitable recording instruments) and this pressure is proportional to the pressure on the diaphragm 16. The unit achieves a force balance proportional to the force of the diaphragm 16 because the pressure acting on the diaphragm 37 moves the diaphragm 37 and the attached force-rebalance rod 41 in opposite direction from arrow 60 to move the surfaces 26 and 27 closer together to throttle the flow of fluid. Of course, if the fluid flow is shut off too much, the pressure in chamber 42 drops and then the diaphragm 16 will again be moved in direction as indicate by arrow 60 until a force balance is achieved between the two diaphragms and the surfaces 26 and 27 remain spaced apart, but at a balanced condition. Any changes in force on the diaphragm 16 will cause a change in this balanced condition and consequently a change in the pressure recording on gauge 52. There is a constant flow of fluid under pressure through the system up through passageway 31 and out through the metered orifice 51. The vent 50 permits the diaphragm 37 to move without any compression of air in second chamber 43. The diaphragm 37 acts much like a piston or movable wall to move the force rod back to a balanced condition.

The flexibility built into the valve assembly by the narrowed or neck-down portion 53 permits this valve assembly to align itself so that there isn't any binding or sticking of the valve assembly which can cause malfunction and make repeatability and linearity difficult to achieve with this type of a unit. Also, the housing section 35 can be removed quite readily from the housing section 34 and the entire force-rod valve assembly 23 removed so that the valve seat 27 can be cleaned or resurfaced easily with a reamer. The force rod can be pulled out through the passageway or chamber 24 because the member 28 is only slip-fitted onto the valve assembly.

The member 28 provides an overpressure stop by colliding with the shoulder formed by the end chamber 21 when the pressure on the diaphragm 16 exceeds a predetermined amount. This provides a mechanical stop to prevent physical damage to the unit.

The device gives good control, ease of manufacture, reduction in the parts used, thus reducing costs. The unit is reliable at relatively low pressure because of the flexibility of the valve head 25 with respect to rod portion 41 which prevents the head from sticking due to misalignment. The valve seat of the unit can be cleaned and even resurfaced without removing the stem from the extruder barrel merely by removing the screws which clamp members 25 to member 34 and pulling the diaphragm 37 and assembly 23 out of the stem or housing 13.

What I claim is:

1. A pressure sensor including a housing, means at a first end of said housing comprising a first diaphragm in position to be deflected from its normal position due to pressure to be sensed, movable wall means in said housing at a point remote from said first diaphragm and forming a chamber in said housing, manually removable means to permit removal of said movable wall means from said housing, a source of fluid under pressure, a first passageway defined in said housing and open to said source of fluid under pressure, a unitary force-balance valve assembly positioned within said first passageway, means to connect said unitary force-balance valve assembly to move with said movable wall means, an annular valve seat formed within said first passageway adjacent said first diaphragm, said force-balance valve assembly including valve means having a surface adapted to mate with said valve seat, a second passageway defined within said unitary force-balance valve assembly, means opening through said force-balance valve assembly to said second passageway on a side of said valve surface opposite from the inlet from said source of fluid under pressure, means coupling said valve means and said first diaphragm whereby movement of said first diaphragm under increased pressure will cause said valve means to move so that the valve surface of said valve means moves away from said valve seat and permits fluid under pressure to move from said source and first passageway into said second passageway, said second passageway opening into said chamber, increased pressure in said chamber causing said movable wall means to exert a force on said force-balance valve assembly to tend to oppose pressure on said first diaphragm, and pressure-responsive readout means associated with said chamber, said unitary force-balance valve assembly fitting within said first passageway between said movable wall means and said valve means and being of size to be removable from said first passageway in direction toward said movable wall means.

2. The combination as specified in claim 1 wherein said unitary force-balance valve assembly includes a rod portion extending from said valve means to said movable wall means, said rod portion being reduced in cross-sectional area adjacent said valve means to permit said rod portion to flex with respect to said valve means for alignment of said valve means and said valve seat.

3. The combination as specified in claim 2 wherein said movable wall means comprises a flexible diaphragm, said housing including a member removably sealingly clamping said flexible diaphragm around its peripheral edges, said chamber being formed on said diaphragm on a side thereof opposite from said valve means.

4. The combination of as specified in claim 2 and an orifice leading from said chamber of size to restrict flow of fluid outwardly from said chamber.

5. A pressure sensor including a housing, means at a first end of said housing comprising a first diaphragm in position to be deflected from its normal position due to pressure to be sensed, said housing defining an elongated stem member extending from adjacent said first diaphragm to a remote second end, movable wall means in said housing at a point remote from said first diaphragm and forming a chamber in said housing, a source of fluid under pressure, a first fluid passageway defined in said stem member, said passageway communicating with said source of fluid under pressure, a second fluid passageway opening to said chamber, a unitary force-rebalance valve assembly within said stem member and including valve means located closely adjacent to and spaced from said first diaphragm and controlling fluid flow between said first and second passageways, said valve means comprising an annular shoulder surface formed inside said stem member and positioned adjacent to said first diaphragm, and a mating surface on said unitary force-rebalance valve assembly, means coupling said valve means to said first diaphragm whereby movement of said first diaphragm under increased pressure will adjust said valve means to change flow of fluid through said first passageway to said second passageway and said chamber and cause a change of pressure in said chamber, said force-rebalance valve assembly including a rod portion movable with said movable wall means and transferring force from said movable wall means through said valve means to the first diaphragm to provide an opposing force on said first diaphragm under increased pressure in said chamber to thereby balance the pressure on the first diaphragm, said rod portion of said unitary force-rebalance valve assembly being reduced in cross-sectional area adjacent said valve means and in a location between the movable wall means and said valve means to permit increased flexibility of said valve means with respect to said rod portion when under force from the movable wall means.

6. The combination as specified in claim 5 wherein said unitary force-rebalance valve assembly is tubular, and has an interior opening comprising said second passageway.

7. The combination as specified in claim 6 and pressure-responsive readout means communicating with said chamber.

8. The combination as specified in claim 5 wherein said valve surface is frustoconical.

9. A pressure sensor including a housing comprising an elongated tubular stem member having a straight first passageway defined longitudinally therethrough, means adjacent a first end of said stem member for mounting said sensor in position to sense pressure, means at the first end of said housing closing said first passageway comprising a first diaphragm in position to deflect from its normal position due to pressure to be sensed, movable wall means in said housing adjacent an end of said elongated stem remote from said first diaphragm and forming one wall of a chamber, a manually removable cap member forming closing walls of said chamber on a side of said movable wall means opposite from said first passageway, a source of fluid under pressure open to said first passageway at a pressure inlet opening, a shoulder defining an open center annular valve seat surface around the interior of said first passageway and facing away from the first diaphragm and being spaced from and adjacent said first diaphragm, a unitary tubular force-rebalance-rod valve assembly mounted within said first straight passageway and extending between said first diaphragm and said movable wall means and including first and second end portions, valve means on said rod valve assembly including a valve surface defined on said tubular member around the exterior thereof and mating with said valve seat, said first rod portion extending from said movable wall to said valve means and said second rod portion extending from said valve surface toward said first diaphragm and coupled thereto, said valve surface controlling fluid flow across said valve seat, an interior passageway in said rod valve assembly opening to said chamber and to the straight first passageway on a side of said valve seat opposite from the pressure inlet opening, means to slidably seal said first rod portion with respect to said first passageway on a side thereof opposite the pressure inlet from said valve means, said first rod portion being connected to said removable wall means, said second rod portion being of size to pass through the open center defined by said annular valve seat, said rod portions transferring force from said movable wall means through said valve means to the first diaphragm to provide an opposing force on said first diaphragm, said valve means being of size to fit within said first passageway to thereby permit removal of said unitary force-rebalancing valve assembly from said housing with said movable wall means in a direction away from the first diaphragm when the manually removable means is removed.

10. The combination of claim 9 wherein said rod valve assembly includes means forming a relief area on the outside of said first rod portion to substantially reduce the cross-sectional area of said first rod portion on a side thereof toward said movable wall means to permit flexing of the valve means for alignment with said valve seat.

11. The combination of claim 10 wherein said movable wall means comprises a flexible diaphragm.